United States Patent
Yen (10) Patent No.: US 10,620,647 B1
(45) Date of Patent: Apr. 14, 2020

(54) REGULATING DEVICE FOR BALANCING BATTERY SETS AND BATTERY AUTOMATIC BALANCING SYSTEM USING THE SAME

(71) Applicant: Quanta Computer Inc., Taoyuan (TW)

(72) Inventor: Wei-Ting Yen, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 16/515,282

(22) Filed: Jul. 18, 2019

(30) Foreign Application Priority Data

Jan. 30, 2019 (TW) .............................. 108103440 A (51) Int. Cl.
*H02J 7/00* (2006.01)
*G05F 1/46* (2006.01)
*B60L 58/12* (2019.01)
*B60L 58/22* (2019.01)
*B60L 50/51* (2019.01)

(52) U.S. Cl.
CPC ................ *G05F 1/46* (2013.01); *B60L 50/51* (2019.02); *B60L 58/12* (2019.02); *B60L 58/22* (2019.02); *H02J 7/0014* (2013.01); *B60L 2210/10* (2013.01)

(58) Field of Classification Search
CPC .......... H02J 7/0019; G05F 1/46; H02M 1/143
See application file for complete search history.

(56) References Cited

U.S. PATENT DOCUMENTS

| 8,030,895 | B2 | 10/2011 | Xiao et al. |
| 10,141,750 | B2 | 11/2018 | Hsieh et al. |
| 2011/0122657 | A1* | 5/2011 | Lawson ................ H02M 3/155 363/20 |
| 2013/0241290 | A1* | 9/2013 | Higuchi ................ H02M 1/126 307/52 |
| 2015/0295426 | A1* | 10/2015 | Hirosawa .............. H02J 7/0019 713/322 |

FOREIGN PATENT DOCUMENTS

| TW | 200937799 A | 9/2009 |
| TW | 201320540 A | 5/2013 |
| TW | 201505324 A | 2/2015 |
| TW | M542282 U | 5/2017 |
| TW | 201828562 A | 8/2018 |

OTHER PUBLICATIONS

Chinese language office action dated Sep. 3, 2019, issued in application TW 108103440.

* cited by examiner

*Primary Examiner* — Harry R Behm
(74) *Attorney, Agent, or Firm* — McClure, Qualey & Rodack, LLP (57) ABSTRACT

A regulating device includes a common mode choke, a switch device and a first control unit. The common mode choke includes an input side and an output side, wherein the input side is coupled to a power-supply device. The switch device includes a first input node, a second input node, a first output node, a second output node, and a third output node. The first output node is coupled to a first battery set, and the second output node is coupled to a second battery set, and the third output node is an empty node. The first control unit compares the first terminal voltage to the second terminal voltage for controlling the first input node to selectively connect to the first output node or the second output node and controlling the second input node to selectively connect to the second output node or the third output node.

10 Claims, 5 Drawing Sheets

REGULATING DEVICE FOR BALANCING BATTERY SETS AND BATTERY AUTOMATIC BALANCING SYSTEM USING THE SAME

CROSS REFERENCE TO RELATED APPLICATIONS

This Application claims priority of Taiwan Patent Application No. 108103440, filed on Jan. 30, 2019, the entirety of which is incorporated by reference herein.

BACKGROUND OF THE INVENTION

Field of the Invention

The present disclosure relates to a battery regulation device and, in particular, to a regulating device and a battery automatic balancing system which are applied to a power system.

Description of the Related Art

As different markets have developed, such as the electric vehicle market, the market for charging stations, and so on, the applications for power systems have become more and more important. A power system includes a plurality of battery sets, and those battery sets are connected in series or in parallel. As a result, a power system can supply power to devices with different power requirements. Take the electric vehicle as an example: In general, electric vehicles require a DC (direct-current) power source, and the operation voltage of an electric vehicle is about 300-500 volts. However, when the battery sets in the power system of an electric vehicle provide power, power imbalance might occur between the battery sets. When such the power imbalance occurs, the life cycle of the battery sets might be reduced as a result, and the battery sets might become damaged. Therefore, research on power balancing systems and devices has also received increased attention.

However, the present techniques of battery balancing degrade the efficiency of the power system and cause the battery sets to charge ineffectively. In addition, the present techniques related to battery balancing require to set a plurality of circuit boards, which significantly increases the cost of manufacturing the product.

BRIEF SUMMARY OF THE INVENTION

In view of this, the present invention proposes a regulating device and a battery automatic balancing system to balance a plurality of battery sets effectively. In this way, the problems mentioned above may be solved.

A regulating device includes a common mode choke, a switching device and a first control unit. The common mode choke includes an input side and an output side. The input side of the common mode choke is coupled to a power-supply device. The output side of the common mode choke includes a first terminal and a second terminal. The switching device includes a first input node, a second input node, a first output node, a second output node and a third output node. The first input node of the switching device is coupled to the first terminal of the common mode choke, and the second input node of the switching device is coupled to the second terminal of the common mode choke. The first output node of the switching device is coupled to a first battery set, and the second output node of the switching device is coupled to a second battery set, and the third output node of the switching device is floated (or an idle contact). The first control unit is configured to compare the first terminal voltage of the first output node to the second terminal voltage of the second output node for controlling the first input node to be selectively connected to the first output node or the second output node and controlling the second input node to be selectively connected to the second output node or the third output node. When the first control unit identifies that the first terminal voltage is higher than the second terminal voltage by an amount that is outside an error range, the first control unit controls the first input node to connect to the second output node. When the first control unit identifies that the second terminal voltage is higher than the first terminal voltage by an amount that is outside the error range, the first control unit controls the second input node to connect to the third output node.

A battery automatic balancing system includes a plurality of battery automatic regulation devices. Each of the plurality of battery automatic regulation devices includes a switch, a current sensing device and a regulating device of claim 1. The switch includes a first terminal, a second terminal and a control terminal. The first terminal is coupled to a power-supply device, and the second terminal is coupled to a load, and the control terminal is coupled to a second control unit. The current sensing device includes a first contact and a second contact. The first contact of the current sensing device is coupled to the second terminal of the switch and the load. In the regulating device of claim 1, the input side of the common mode choke is coupled to the second contact of the current sensing device. The second control unit controls the switch based on the current passing through the current sensing device. When the second control unit identifies that a current maximum target value is higher than the current by an amount that is outside a target range, the second control unit turns the switch on.

DETAILED DESCRIPTION OF THE INVENTION

The present invention is described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The following description is an embodiment of the present invention. The purpose of the present invention is to exemplify the general principles of the invention and should not be construed as limiting the scope of the invention, which is defined by the scope of the claims.

The present invention mainly performs an active balance on a plurality of battery sets, and one of the balance methodologies is the mechanism of current sharing. In general, power systems may comprise power-supply device and transformers. The transformers in the power systems can be isolated transformers, but the present invention is not limited to this. Take an isolated transformer as an example. The power-supply device is usually connected to the primary side of the isolated transformer, and the battery set(s) would be usually connected to the secondary side of the isolated transformer. Furthermore, most of the battery sets have parasitic impedances, capacitors and other parameters. For making the current sharing mechanism of the active balancing fully function to the battery sets, the present invention mainly utilizes the current error of the secondary side of the transformer to balance the battery sets.

In the present invention, the battery can be a lead-acid battery, a lithium battery, a nickel-metal-hybrid battery or a zinc-manganese battery etc., but the invention is not limited thereto.

Figure 1:
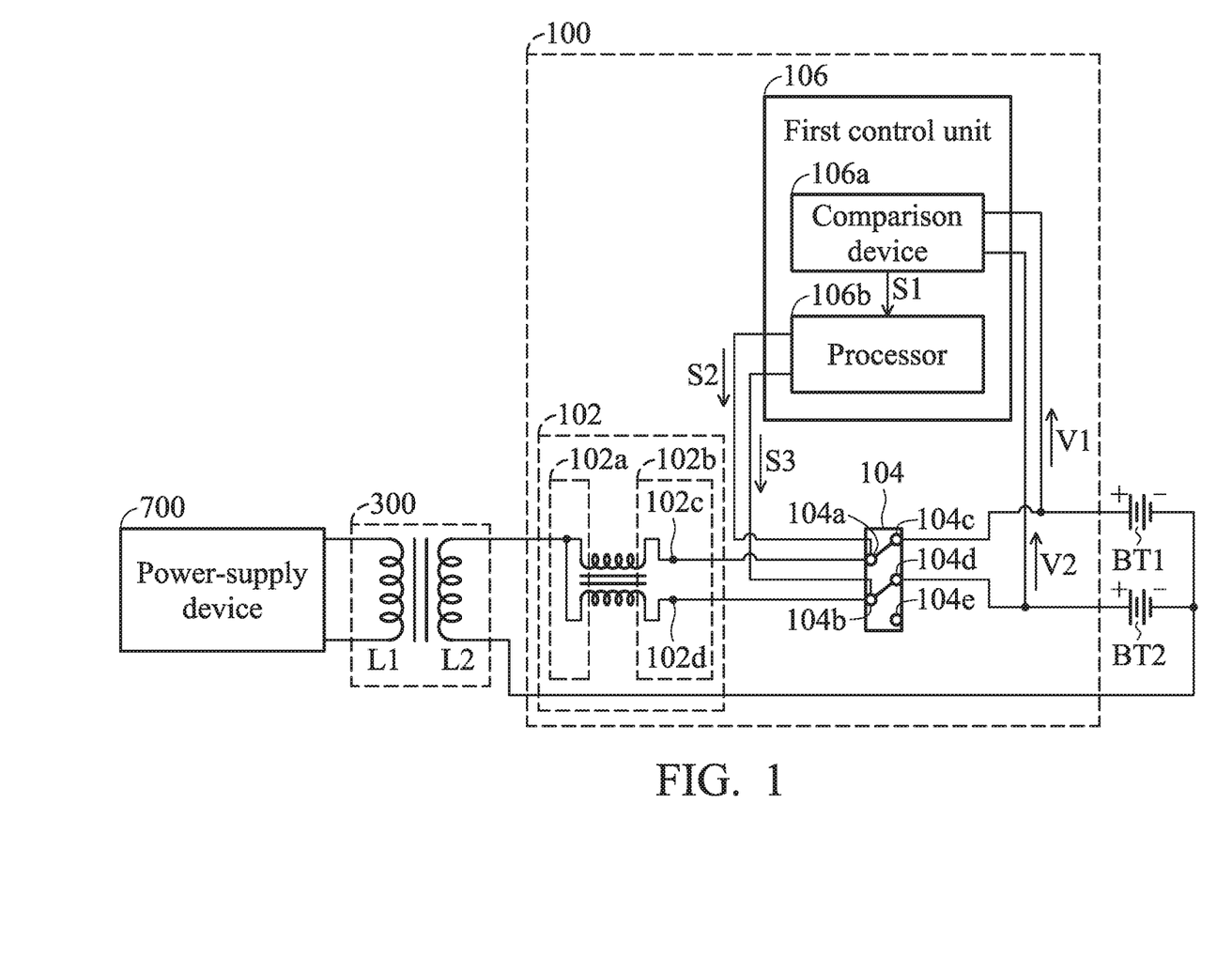
FIG. 1 is a schematic diagram showing a regulating device, in accordance with one embodiment of the present invention.

FIG. 1 is a schematic diagram showing a regulating device 100, in accordance with one embodiment of the present invention. As shown in FIG. 1, the regulating device 100 for balancing battery sets is coupled to the transformer 300, and the transformer 300 is coupled to the power-supply device 700. The transformer 300 includes a primary winding L1 and a secondary winding L2. The primary winding L1 in the transformer 300 is coupled to the power-supply device 700 for delivering the power from the power-supply device 700 to the secondary winding L2 in the transformer 300. The regulating device 100 for balancing battery sets receives the power output from the power-supply device 700 by the secondary winding L2 in the transformer 300. The regulating device 100 uses the power from the power-supply device 700 to charge the first battery set BT1 and the second battery set BT2. The operation of the regulating device 100 will be described below in detail.

As shown in FIG. 1, the regulating device 100 includes a common mode choke 102, a switching device 104 and a first control unit 106. The common mode choke 102 includes an input side 102a and an output side 102b. The input side 102a of the common mode choke 102 is coupled to the power-supply device 700 through the transformer 300 in order to receive the power output by the power-supply device 700. The output side 102b of the common mode choke 102 includes a first terminal 102c and a second terminal 102d, wherein the first terminal 102c and the second terminal 102d are coupled to the switching device 104. The switching device 104 includes a first input node 104a, a second input node 104b, a first output node 104c, a second output node 104d and a third output node 104e. The first input node 104a in the switching device 104 is coupled to the first terminal 102c of the common mode choke 102, and the second input node 104b in the switching device 104 is coupled to the second terminal 102d of the common mode choke 102. The first output node 104c in the switching device 104 is coupled to the first battery set BT1, and the second output node 104d in the switching device 104 is coupled to the second battery set BT2, and the third output node 104e in the switching device 104 is floated (or an idle contact). As a result, the voltage at the first output node 104c of the switching device 104 is the voltage level (the first terminal voltage V1) of the first battery set BT1, and the voltage at the second output node 104d of the switching device 104 is the voltage level (the second terminal voltage V2) of the second battery set BT2.nodenode Specifically, in practical applications, there is a rectifying device (not shown) between the transformer 300 and the common mode choke 102, the rectifying device such as a capacitor, a rectifying circuit, a rectifier and so on. The rectifying device converts the power output by the transformer 300 to the stable DC power for the common mode choke 102. By the switching device 104, the common mode choke 102 provides the DC power converted by the rectifying device to the first battery set BT1 and the second battery set BT2. For the purpose of simplifying the illustration for the present invention, the rectifying device is not shown in FIG. 1.

As stated above, the first control unit 106 in the regulating device 100 includes a comparison device 106a and a processor 106b. As shown in FIG. 1, the first output node 104c of the switching device 104 and the first battery set BT1 are commonly coupled to the comparison device 106a in the first control unit 106, and the second output node 104d of the switching device 104 and the second battery set BT2 are commonly coupled to the comparison device 106a in the first control unit 106. As a result, the comparison device 106a can receive the first terminal voltage V1 of the first output node 104c and the second terminal voltage V2 of the second output node 104d. The comparison device 106a in the first control unit 106 compares the first terminal voltage V1 at the first output node 104c and the second terminal voltage V2 at the second output node 104d. According to the comparison result, the comparison device 106a outputs the comparison signal S1 to the processor 106b. Therefore, based on the comparison signal S1 output by the comparison device 106a, the processor 106b in the first control unit 106 can identify whether a voltage difference between the first terminal voltage V1 and the second terminal voltage V2 falls within an error range and thereby generates a control signal S2 and a control signal S3 to the switching device 104.

The processor 106b in the first control unit 106 outputs the control signal S2 for controlling the first input node 104a in the switching device 104 to selectively connect to the first output node 104c or the second output node 104d. The processor 106b in the first control unit 106 outputs the control signal S3 for controlling the second input node 104b in the switching device 104 to selectively connect to the second output node 104d or the third output node 104e.

In some embodiments, when the processor 106b in the first control unit 106 identifies that the first terminal voltage V1 is higher than the second terminal voltage V2 by an amount that is outside the error range based on the comparison signal S1, the processor 106b in the first control unit 106 outputs the control signal S2 to control the first input node 104a in the switching device 104 to connect to the second output node 104d. Additionally, when the processor 106b in the first control unit 106 identifies that the second terminal voltage V2 is higher than the first terminal voltage V1 by an amount that is outside the error range based on the comparison signal S1, the processor 106b in the first control unit 106 outputs control signal S3 to control the second input node 104b in the switching device 104 to connect to the third output node 104e. In this embodiment, when the first terminal voltage V1 is higher than the second terminal voltage V2 by an amount that is outside the error range, this indicates that the battery power of the first battery set BT1 is greater than the battery power of the second battery set BT2. Similarly, when the second terminal voltage V2 is higher than the first terminal voltage V1 by an amount that is outside the error range, it indicates that the battery power of the second battery set BT2 is greater than the battery power of the first battery set BT1.

As stated above, when a voltage difference between the first terminal voltage V1 and the second terminal voltage V2 does not fall within the error range, the processor 106b in the first control unit 106 identifies that the first battery set BT1 and the second battery set BT2 are in an imbalanced state. That is, when the battery power of the first battery set BT1 is greater than the battery power of the second battery set BT2, the regulating device 100 controls the power-supply device 700 to charge the second battery set BT2 and stops the power-supply device 700 charging the first battery set BT1. At this time, the processor 106b in the first controls unit 106 controls the first input node 104a in the switching device 104 to connect to the second output node 104d in the switching device 104 by outputting control signal S2. The processor 106b also controls the second input node 104b in the switching device 104 to continuously connect to the second output node 104d by outputting control signal S3.

when the battery power of the second battery set BT2 is greater than the battery power of the first battery set BT1, the regulating device 100 controls the power-supply device 700 to charge the first battery set BT1 and stops the power-supply device 700 charging the second battery set BT2. At this time, the processor 106b in the first control unit 106 controls the first input node 104a in the switching device 104 to connect to the first output node 104c in the switching device 104. The processor 106b in the first control unit 106 also controls the second input node 104b in the switching device 104 to connect to the third output node 104e in the switching device 104. Specifically, in the present embodiment, the third output node 104e in the switching device 104 is configured to be floated (an idle contact), but the present invention is not limited to this.

In the embodiment mentioned above, when the voltage difference between the first terminal voltage V1 and the second terminal voltage V2 falls within the error range, the processor 106b in the first control unit 106 identifies that the first battery set BT1 and the second battery set BT2 remain an appropriately balanced state. Because the first battery set BT1 and the second battery set BT2 still remain an appropriate balanced state, the first control unit 106 controls the first input node 104a in the switching device 104 to connect to the first output node 104c and controls the second input node 104b in the switching device 104 to connect to the second output node 104d, through the control signals S2 and S3. As a result, by passing through the regulating device 100, the power-supply device 700 can equivalently charges the first battery set BT1 and the second battery set BT2.

Figure 2:
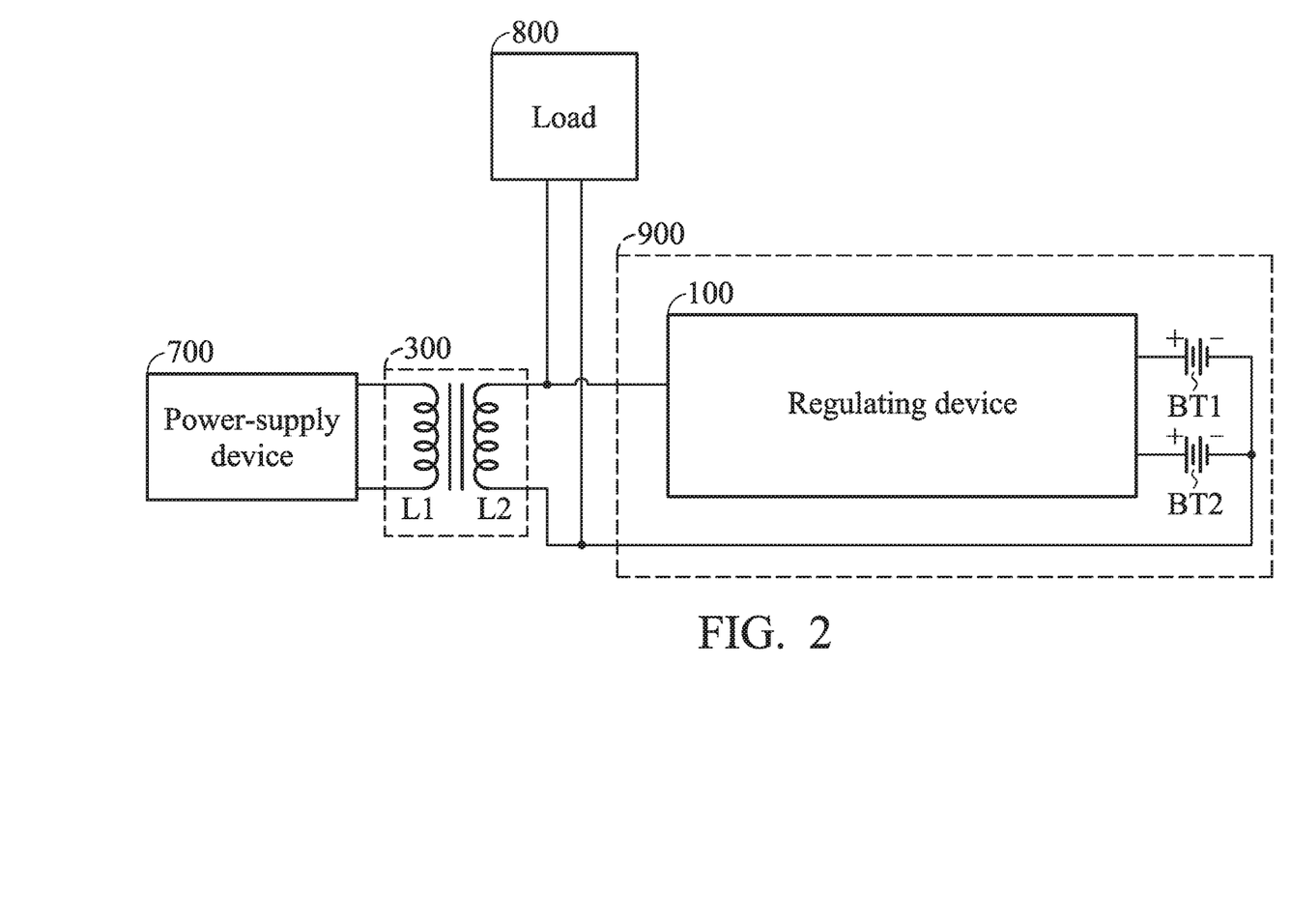
FIG. 2 is a schematic diagram showing the operation of the regulating device, in accordance with another embodiment of the present invention.

FIG. 2 is a schematic diagram for the operation of the regulating device 100, in accordance with another embodiment of the present invention. In some other embodiments, the regulating device 100 can be applied to not only the power system in the electric vehicles but also a power backup system. As shown in FIG. 2, the power backup system 900 can include a regulating device 100, a first battery set BT1 and a second battery set BT2. Hereinafter, please refer to FIG. 1 and FIG. 2 simultaneously to explain the present embodiment below. Under the normal condition, the power-supply device 700 can supply enough power to the load 800 and charge the power backup system 900 in the meantime. In the charging procedure for the power backup system 900, the method of the operation of the regulating device 100 is the same as the operation shown in FIG. 1, so it will not be repeated. When the power-supply device 700 cannot provide enough power to the load 800 normally, the first battery set BT1 and the second battery set BT2 in the power backup system 900 starts to provide power to the load 800.

In the discharging procedure for the first battery set BT1 and the second battery set BT2, the comparison device 106a in the first control unit 106 compares the first terminal voltage V1 and the second terminal voltage V2, and the comparison device 106a also outputs the comparison results to the processor 106b in the first control unit 106 for controlling the switching device. The method by which the first control unit 106 controls the switching device 104 is the same as the method shown in FIG. 1, so it will not be repeated.

In the discharging procedure for the first battery set BT1 and the second battery set BT2, when the battery power of the first battery set BT1 is greater than the battery power of the second battery set BT2, the regulating device 100 needs to stop the second battery set BT2 from providing power to the load 800 and makes the first battery set BT1 provide power to the load 800 continuously. At this time, according to the comparison signal S1, the processor 106b in the first control unit 106 controls the first input node 104a to connect to the first output node 104c in the switching device 104, by outputting the corresponding control signal S2. The processor 106b in the first control unit 106 also controls the second input node 104b to connect to the third output node 104e in the switching device 104, by outputting the control signal S3. When the battery power of the first battery set BT1 and the battery power of the second battery set BT2 reach a balanced state, the processor 106b controls the first input node 104a to connect to the first output node 104c and controls the second input node 104b to connect to the second output node 104d, by respectively outputting the corresponding control signals S2 and S3.

On the other hand, when the battery power of the second battery set BT2 is greater than the battery power of the first battery set BT1, the regulating device 100 needs to stop the first battery set BT1 from providing power to the load 800 and makes the second battery set BT2 provide power to the load 800 continuously. At this time, according to the comparison signal S1, the processor 106b in the first control unit 106 outputs control signal S2 to control the first input node 104a to connect to the second output node 104d in the switching device 104. The processor 106b in the first control unit 106 also outputs control signal S3 to control the second input node 104b to connect to the second output node 104d in the switching device 104. When the battery power of the first battery set BT1 and the battery power of the second battery set BT2 reach a balanced state, the processor 106b output control signal S2 to control the first input node 104a to connect to the first output node 104c and outputs control signal S3 to control the second input node 104b to connect to the second output node 104d.

In the each embodiment described above, the first control unit 106 in the regulating device 100 for balancing battery sets plays an important role. Therefore, the following disclosure will continue to explain the operation method of the first control unit 106 in detail.

Figure 3:
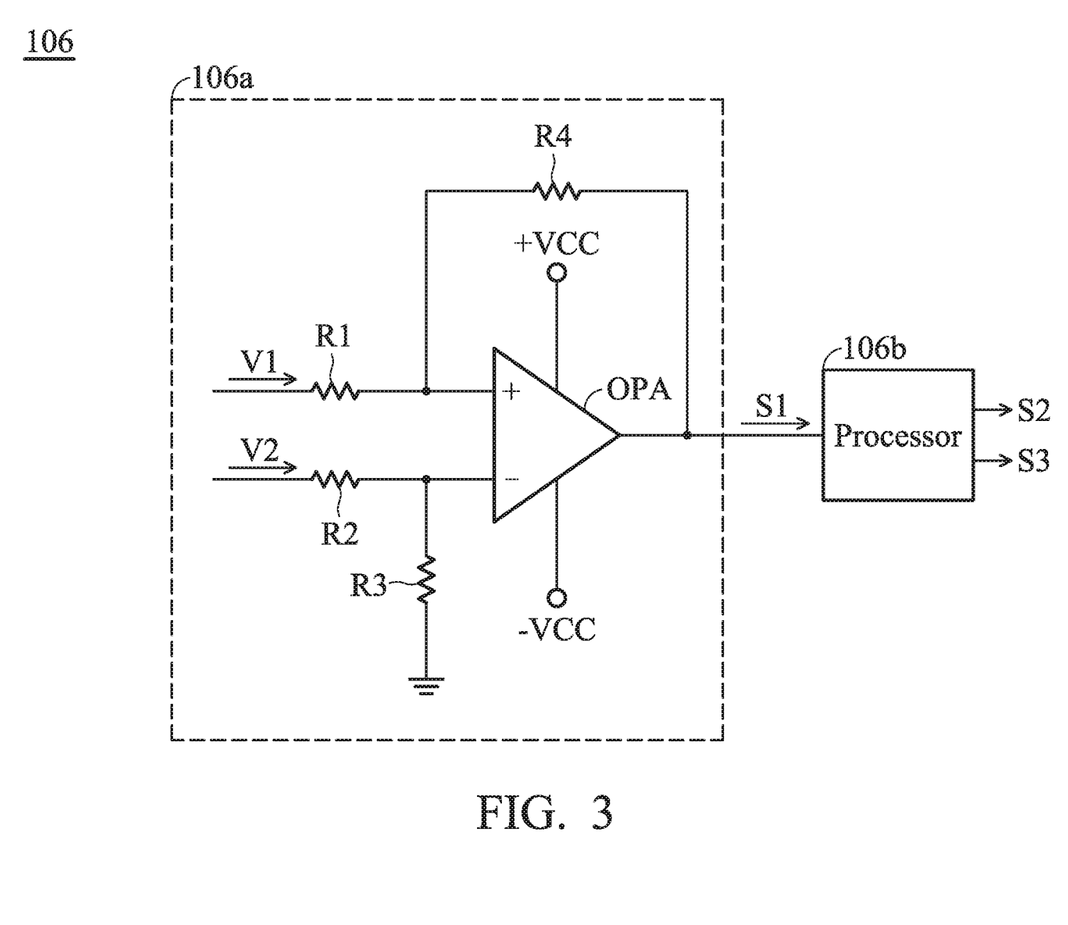
FIG. 3 is a schematic diagram showing the first control unit, in accordance with one embodiment of the present invention.

FIG. 3 is a schematic diagram showing the first control unit 106, in accordance with one embodiment of the present invention. As shown in FIG. 3, the first control unit 106 includes a comparison device 106a and the processor 106b. The comparison device 106a includes resistors R1~R4 and an operational amplifier OPA. Please refer to FIG. 1 and FIG. 3 to illustrate the structure of the first control unit 106. The resistor R1 is coupled to the first terminal voltage V1, and the resistor R1 is also coupled to the resistor R4 and the positive terminal of the operational amplifier OPA. The resistor R2 is coupled to the second terminal voltage V2, and the resistor R2 is also coupled to the resistor R3 and the negative terminal of the operational amplifier OPA. The resistor R4 is coupled to the resistor R1 and the output terminal of the operational amplifier OPA. In addition, the operational amplifier OPA is also coupled to the positive power terminal +Vcc and the negative power terminal −Vcc. Specifically, in this embodiment, the resistances of the resistors R1~R4 are identical, but the present invention is not limited to this.

According to the exemplary circuit of the comparison device 106a described above, the comparison signal S1 output by the comparison device 106a can be derived as shown below, in some examples but not limited thereto:

$$S1=\Delta V=V2-V1.$$

As a result, the comparison device 106a in the first control unit 106 can be considered as a subtractor for computing the voltage difference $\Delta V$ between the first terminal voltage V1 and the second terminal voltage V2. According to the comparison signal S1, the processor 106b in the first control unit 106 can identify whether the voltage difference $\Delta V$ between the first terminal voltage V1 and the second terminal voltage V2 falls within the error range.

When the comparison signal S1 is a positive voltage, the processor 106b can identify that the second terminal voltage V2 is higher than the first terminal voltage V1. Similarly, when the comparison signal S1 is a negative voltage, the processor 106b can identify that the first terminal voltage V1 is higher than the second terminal voltage V2. In addition, according to the absolute value of the comparison signal S1, the processor 106b can identify whether the voltage difference $\Delta V$ between the first terminal voltage V1 and the second terminal voltage V2 falls within the error range.

The error range can be calculated by the following methods carried out by the processor 106b: dividing the voltage device $\Delta V$ by the first terminal voltage V1, or dividing the voltage device $\Delta V$ by the second terminal voltage V2. In some other embodiments, if the processor 106b identifies that the first terminal voltage V1 is higher than the second terminal voltage V2, the processor 106b would adopt that the voltage difference $\Delta V$ is divided by the first terminal voltage V1 for calculating the error range. If the processor 106b identifies that the second terminal voltage V2 is higher than the first terminal voltage V1, the processor 106b would adopt that the voltage difference $\Delta V$ is divided by the second terminal voltage V2 for calculating the error range. In addition, if the processor 106b determines that the error range is greater than 5%, the processor 106b would identify that the first battery set BT1 and second battery set BT2 are in an imbalanced state. The processor 106b outputs the control signals S2 and S3 to control the switching device 104. If the processor 106b determines that the error range is less than 5%, the processor 106b would identify that the first battery set BT1 and second battery set BT2 are in an ideal balanced state The each embodiment described above only illustrates the regulating device 100 for balancing two battery sets. However, in practical applications, since different loads have different requirements of power, a battery automatic balancing system having a plurality of regulating devices 100 has been developed. The following illustration describes the operation methods of the battery automatic balancing system in detail.

Figure 4:
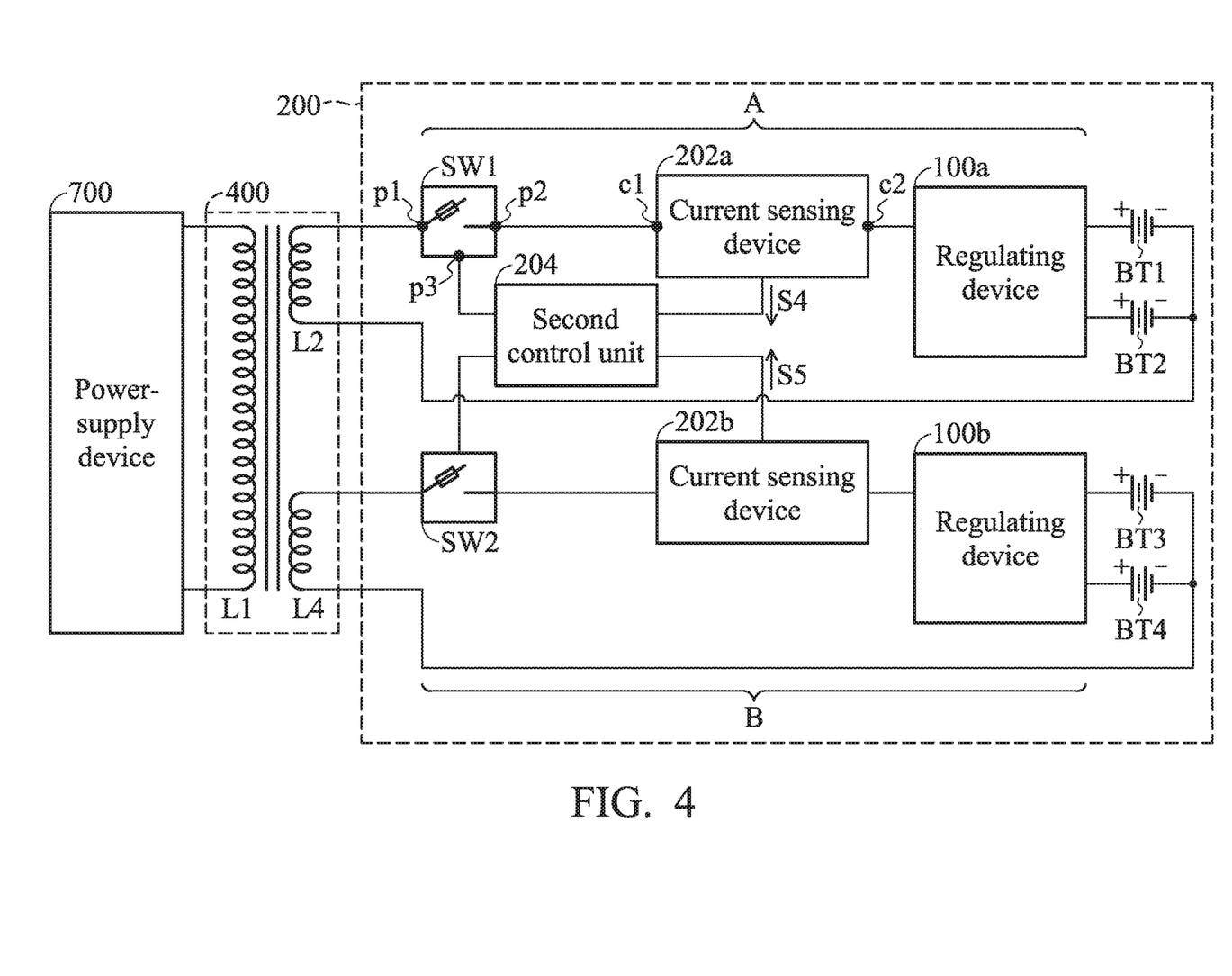
FIG. 4 is a schematic diagram showing a battery automatic balancing system, in accordance with one embodiment of the present invention.

FIG. 4 is a schematic diagram showing a battery automatic balancing system 200, in accordance with one embodiment of the present invention. As shown in FIG. 4, the battery automatic balancing system can include at least two battery automatic regulation devicesA, B, and the second control unit 204. Specifically, in this embodiment, although there are only two battery automatic regulation devices A, B in the battery balancing system 200 in FIG. 4, more than two battery automatic regulation devices can be placed in the in the battery balancing system 200 based on the demands of the practical applications. In order to simplify the illustration for the operation of the present invention, each of the following embodiments uses a battery automatic balancing system having two battery automatic regulation devices A and B as an example, but the present invention is not limited to this.

In FIG. 4, each of the battery automatic regulation devices A (or B) includes a switch SW1 (or SW2), a current sensing device 202a (or 202b) and a battery regulation unit 100a (or 100b) shown as FIG. 1. All of the hardware (including regulating device 100a and 100b), switches (SW1 and SW2), current sensing devices (202a and 202b), modules, software, firmware in the battery automatic regulation devices (A and B) have identical specifications and designs, and all of them are generated and supplied by the same suppliers. In addition, the battery sets BT1~BT4 which are applied in the battery automatic balancing system 200 have identical designs and specifications and are generated by the identical suppliers. As a result, the operation of the battery automatic balancing system 200 can be optimized.

In addition, the second control unit 204 in the battery automatic balancing system 200 can be a processor, a controller, a chip or a central processing unit (CPU) etc., but the present invention is not limited to this.

In FIG. 4, the switch SW1 in the battery automatic balancing system 200 includes a first terminal p1, a second terminal p2 and a control terminal p3. The first terminal p1 of the switch SW1 is coupled to the power-supply device 700 by the transformer 400, and the first terminal p1 can receive the power from the power-supply device 700. The second terminal p2 of the switch SW1 is coupled to a load (not shown in FIG. 4). The third terminal p3 of the switch SW1 is coupled to the second control unit 204, so the second control unit 204 can control the status of the switch SW1 (on or off).

In this embodiment, the transformer 400 includes a primary winding L1 and the secondary windings L2 and L4. The primary winding L1 of the transformer 400 is coupled to the power-supply device 700. The secondary winding L2 is coupled to the battery automatic regulation device A, and the secondary winding L4 is coupled to the battery automatic regulation device B. In the transformer 400, because the secondary winding L1 and the secondary winding L2 are identical winding, so the battery automatic regulation device A and the battery automatic regulation device B receive identical power.

Please refer to FIG. 1 and FIG. 4. The current sensing device 202a includes a first contact C1 and a second contact C2. The first contact C1 in the current sensing device 202a is coupled to the second terminal p2 of the switch SW1 and the load (not pictured). The second contact C2 of the current sensing device 202a is coupled to the input side 102a of the common mode choke 102 in the regulating device 100a. The manner of connecting the regulating device 100a used in the first battery set BT1 and the second battery set BT2 are shown in FIG. 1 in detail, so it is not repeated herein. Consequently, the power (such as current) provided by the power-supply device 700 can pass through the switch SW1, the current sensing device 202a and the regulating device 100a to charge the first battery set BT1 and the second battery set BT2. In addition, according to the current from the power-supply device 700, the current sensing device 202a delivers a current sensing signal S4 to the second control unit 204. According to the current sensing signal S4, the second control unit 204 turns the switch SW1 on or off.

The manner of connecting the battery automatic regulation device B is the same as the battery automatic regulation device A, so it is not repeated. The current sensing device 202b delivers a current sensing signal S5 to the second control unit 204. According to the current sensing signal S5, the second control unit 204 turns the switch SW2 on or off.

In some embodiments, the second control unit 204 in the battery automatic balancing system can compare the current sensing signal S4 to the current sensing signal S5 for controlling the switches SW1 and SW2 to be on or off. If the second control unit 204 identifies that the current difference between the current sensing signals S4 and S5 falls within a target range (about 16 mA), the second control unit 204 would control the switches SW1 and SW2 to be off. At this time, the battery sets BT1 and BT2 and the battery sets BT3 and BT4 can equivalently provide power to the load.

If the second control unit 204 identifies that the current sensing signal S4 is larger than the current sensing signal S5 by an amount that is outside the target range (about 16 mA), the second control unit 204 identifies that there is an imbalanced state between the battery automatic regulation devices A and B. The power output by the battery automatic regulation device A is greater than the power output by the battery automatic regulation device B. At this time, the second control unit 204 turns the switch SW1 on and turns the switch SW2 off. As a result, the power output by the battery automatic regulation device A can be delivered to the primary winding L1 in the transformer 400 by passing through the secondary winding L2 in the transformer 400. When the second control unit 204 identifies that the current difference between the current sensing signals S4 and S5 falls within a target range (about 16 mA), the second control unit 204 recovers the switches SW1 and SW2 to be off.

Similarly, if the second control unit 204 identifies that the current sensing signal S5 is larger than the current sensing signal S4 by an amount that is outside the target range (about 16 mA), the second control unit 204 would identify that the power output by the battery automatic regulation device B is greater than the power output by the battery automatic regulation device A. At this time, the second control unit 204 turns the switch SW1 off and turns the switch SW2 on. As a result, the power output by the battery automatic regulation device B can be delivered to the primary winding L1 in the transformer 400 by passing through the secondary winding L4 in the transformer 400. When the second control unit 204 identifies that the current difference between the current sensing signals S4 and S5 falls within a target range (about 16 mA), the second control unit 204 recovers the switch SW2 to be off.

In some other embodiments, if the second control unit 204 identifies that the current sensing signal S4 is larger than the current sensing signal S5 by an amount that is outside the target range (about 16 mA), the second control unit 204 identifies that there is an imbalanced state between the battery automatic regulation devices A and B. The power output by the battery automatic regulation device B is smaller than the power output by the battery automatic regulation device A. At this time, the second control unit 204 turns the switch SW2 on and turns the switch SW1 off. As a result, the power-supply device 700 can provide power to the secondary winding L4 in the transformer 400 by the primary winding L1 in the transformer 400. As a result, the battery automatic regulation device B can receive the power from the power-supply device 700 by the transformer 400. When the second control unit 204 identifies that the current difference between the current sensing signals S4 and S5 falls within a target range (about 16 mA), the second control unit 204 recovers the switch SW2 to be off. As stated above, similarly, if the second control unit 204 identifies that the current sensing signal S5 is larger than the current sensing signal S4 by an amount that is outside the target range (about 16 mA), the second control unit 204 would identify that the power output by the battery automatic regulation device A is smaller than the power output by the battery automatic regulation device B. At this time, the second control unit 204 turns the switch SW1 on and turns the switch SW2 off. As a result, the power-supply device 700 can provide power to the secondary winding L2 in the transformer 400 by the primary winding L1 in the transformer 400. As a result, the battery automatic regulation device A can receive the power from the power-supply device 700 by the transformer 400. When the second control unit 204 identifies that the current difference between the current sensing signals S4 and S5 falls within a target range (about 16 mA), the second control unit 204 recovers the switch SW1 to be off.

Figure 5:
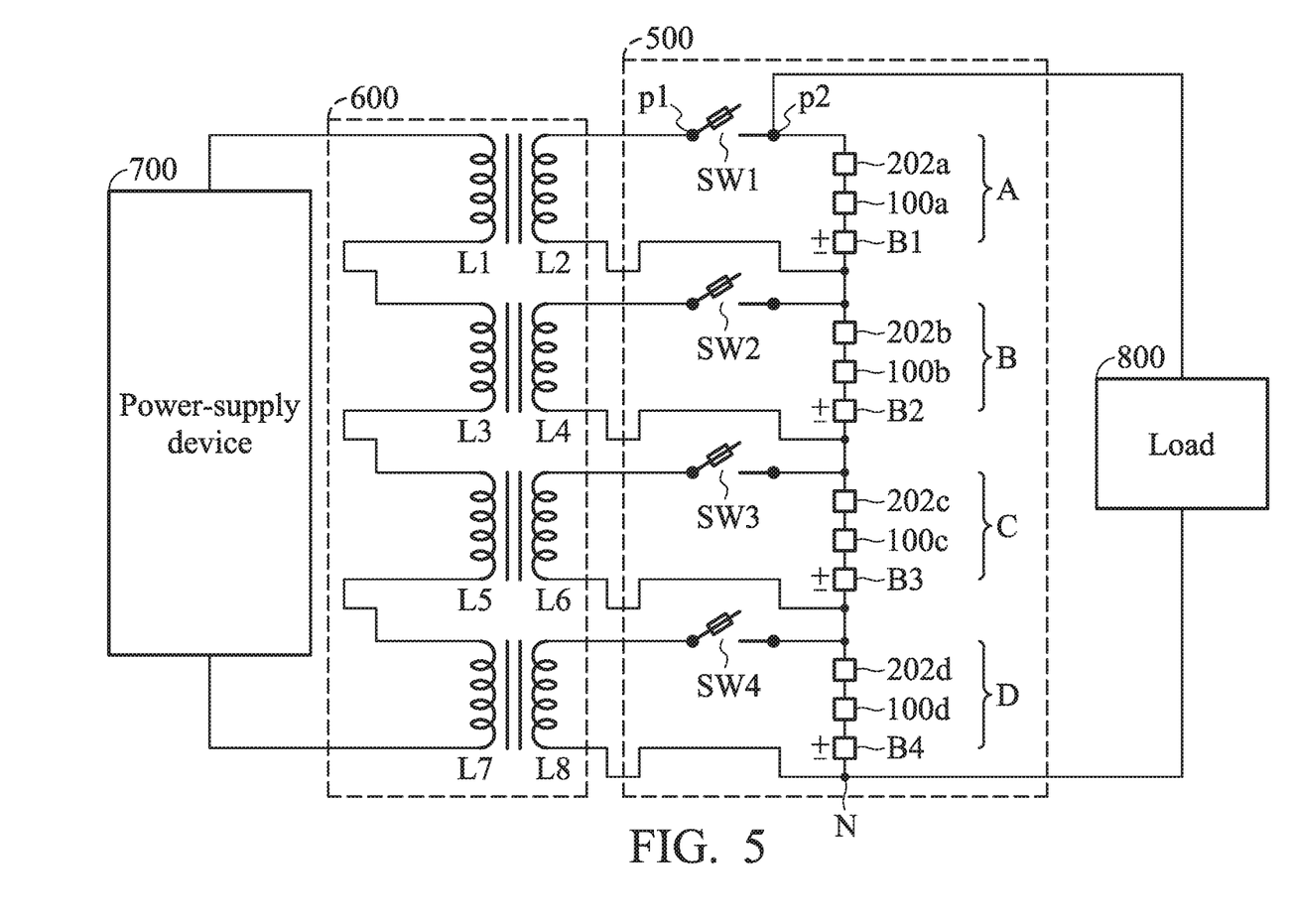
FIG. 5 is a schematic diagram showing a battery automatic balancing system, in accordance with another embodiment of the present invention.

FIG. 5 is a schematic diagram showing a battery automatic balancing system 500, in accordance with another embodiment of the present invention. In this embodiment, the battery automatic balancing system 500 has more than two battery automatic regulation devices A~D. Specifically, the number of the battery automatic regulation devices A~D shown in FIG. 5 are used as an example, but the present invention is not limited to this. Each of the battery automatic regulation devices A~D has a switch, a current sensing device and a regulating device. As shown in FIG. 5, the battery automatic regulation device A is used as an example. The battery automatic regulation device A includes a switch SW1, a current sensing device 202a and a regulating device 100a. The other battery automatic regulation devices B~D are identical with the battery automatic regulation device A.

Please refer to FIG. 4 and FIG. 5. Specifically, the battery automatic balancing system 500 also includes a second control unit 204 (not shown). The second control unit 204 in the battery automatic balancing system 500 is coupled to the current sensing devices 202a-202d for receiving the current sensing signals output by the current sensing devices 202a-202d. Furthermore, the second control unit 204 in the battery automatic balancing system 500 is also coupled to the control terminals (not pictured) of the switches SW1~SW4 for controlling the switches SW1~SW4 to be on or off respectively. For simplifying the drawing, FIG. 5 does not show the second control unit 204 in the battery automatic balancing system 500 and the connection manners of the second control unit 204, the switches SW1~SW4 and the current sensing devices 202a-202d.

The manner of connecting the battery automatic regulation devices A~D have been shown in FIG. 4. Using the battery automatic regulation devices A in FIG. 5 as an example, the manner of connecting the switch SW1, the current sensing device 202a and the regulating device 100a are identical with the battery automatic regulation devices A in FIG. 4. Besides, in FIG. 5, the battery automatic regulation devices A are coupled to the battery module B1, and the battery module B1 simplifies drawing of the first battery set BT1 and the battery set BT2 in FIG. 4. The other battery modules B2~B4 are identical with the battery module B1. Therefore, the descriptions of the operation of the battery automatic regulation devices A~D are not repeated in this embodiment.

In FIG. 5, the switch SW1 includes a first terminal p1, a second terminal p2 and a control terminal (not pictured) in the battery automatic regulation device A. The first terminal p1 of the switch SW1 is coupled to the power-supply device 700 by the transformer 600. The second terminal p2 of the switch SW1 is coupled to the load 800 and the current sensing device 202a. In addition, the load 800 is coupled to the negative electrode N of the battery module B4. As a result, under normal operation, the battery modules B1~B4 provide power to the load 800 in the meantime. The second control unit 204 turns off the switches SW1~SW4.

In some embodiments, the second control unit 204 can obtain the current values of the currents passing through the current sensing device 202a-202d using the current sensing device 202a-202d, as shown as Table 1 below:

TABLE 1

| Current sensing device | Current value (mA) |
|---|---|
| 202a | 190 |
| 202b | 180 |
| 202c | 220 |
| 202d | 210 |

When the second control unit 204 computes the current values of the current sensing device 202a-202d, the second control unit 204 determines the current maximum target value. As shown in Table 1, when the second control unit identifies the current of the current sensing device 202c as the highest current, the second control unit 204 uses the current (220 mA) of the current sensing device 202c as the current maximum target value. At the same time, the second control unit 204 compares the current maximum target value to the individual current passing through the current sensing devices 202a, 202b and 202d.

When the second control unit 204 identifies that the current maximum target value is higher than the current passing through the other current sensing devices by an amount that is outside the target range (16 mA), the second control unit 204 turns the switch on. As shown in Table 1, the second control unit 204 uses the current of the current sensing device 202c as the current maximum target value (220 mA). Then, the second control unit 204 identifies that the current of the current sensing device 202a and the current of the current sensing device 202b are lower than the current maximum target value (220 mA), and the current difference is over the target range (16 mA). Therefore, the second control unit 204 turns on switch SW1 and switch SW2 so that the power-supply device 700 can provide power to the battery automatic regulation device A and the battery automatic regulation device B. At this time, the second control unit 204 also identifies that the current of the current sensing device 202d is lower than the current maximum target value; however, because the current difference between the current sensing device 202d and the current maximum target current is not more than 16 mA, the second control unit 204 turns the switch SW4 off.

As stated above, if the second control unit 204 identifies that the current difference between the current of the current sensing device 202a and the current maximum target current falls within the target range (less than 16 mA), the second control unit 204 turns the switch SW1 off. Similarly, if the current of the current sensing device 202b and the current maximum target current falls within the target range (less than 16 mA), the second control unit 204 turns the switch SW2 off.

In some other embodiments, when the second control unit 204 computes the current values of the current sensing device 202a-202d, the second control unit 204 determines the current minimum target value. As shown in Table 1, when the second control unit identifies the current of the current sensing device 202b as the lowest current, the second control unit 204 uses the current (180 mA) of the current sensing device 202b as the current minimum target value. At the same time, the second control unit 204 compares the current minimum target value to the individual current passing through the current sensing devices 202a, 202c and 202d respectively.

As shown in Table 1, the second control unit 204 identifies that the current of the current sensing device 202c and the current sensing device 202d is higher than the current minimum target value, and the current difference is over the target range (16 mA). Therefore, the second control unit 204 turns switch SW3 and switch SW4 on, and the battery automatic regulation device C and the battery automatic regulation device D discharge by passing through the transformer 600. At this time, the second control unit 204 identifies that the current of the current sensing device 202a is higher than the current minimum target value; however, because the current difference of the current of the current sensing device 202a and the current minimum target is not more than 16 mA, the second control unit 204 turns the switch SW1 off.

As stated above, if the second control unit 204 identifies that the current difference between the current of the current sensing device 202c and the current minimum target value falls within the target range (less than 16 mA), the second control unit 204 turns the switches SW3 off. Similarly, if the current of the current sensing device 202d and the current maximum target current falls within the target range (less than 16 mA), the second control unit 204 turns the switch SW4 off.

In the present invention, the current sensing devices 202a-202d have identical specifications and design, and the current sensing devices 202a-202d are supplied by the same supplier. Additionally, the current sensing devices 202a-202d can be current sensors or hall sensors and so on, but the present invention is not limited to this.

In summary, the regulating device 100 makes use of the switching device 104 to control the balanced state of the battery sets. Furthermore, by matching the operation of the switches in the battery automatic balancing system, the present invention is more effective in balancing the battery in the power system.

While the invention has been described above in terms of a preferred embodiment, it is not intended to limit the scope of the invention, and it should be understood by those of ordinary skill in the art without departing from the spirit and scope of the invention. Instead, the scope of the invention should be determined by the scope of the appended claims.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

What is claimed is:

1. A regulating device for balancing battery sets, comprising:
    a common mode choke, comprising an input side and an output side, wherein the input side is coupled to a power-supply device, and the output side comprises a first terminal and a second terminal;
    a switching device, comprising a first input node, a second input node, a first output node, a second output node and a third output node; wherein the first input node is coupled to the first terminal of the common mode choke, and the second input node is coupled to the second terminal of the common mode choke; wherein the first output node is coupled to a first battery set, and the second output node is coupled to a second battery set, and the third output node is floated; and
    a first control unit, configured to compare a first terminal voltage of the first output node to a second terminal voltage of the second output node for controlling the first input node to be selectively connected to the first output node or the second output node and controlling the second input node to be selectively connected to the second output node or the third output node;
    when the first control unit determines that the first terminal voltage is higher than the second terminal voltage by an amount that is outside an error range, the first control unit controls the first input node to connect to the second output node; when the first control unit identifies that the second terminal voltage is higher than the first terminal voltage by an amount that is outside the error range, the first control unit controls the second input node to connect to the third output node.

2. The regulating device of claim 1, wherein when a voltage difference between the first terminal voltage and the second terminal voltage falls within the error range, the first control unit controls the first input node to connect to the first output node and controls the second input node to connect to the second output node.

3. The regulating device of claim 2, wherein the first control unit comprises a comparison device which compares the first terminal voltage and the second terminal voltage for outputting a comparison signal.

4. The regulating device of claim 3, wherein the first control unit further comprises a processor, configured to identify whether the voltage difference between the first terminal voltage and the second terminal voltage falls within the error range or not, in accordance with the comparison signal.

5. The regulating device of claim 4, wherein the error range is 5%.

6. A battery automatic balancing system, comprising a plurality of battery automatic regulation devices, wherein each of the plurality of battery automatic regulation devices comprises:
    a switch, comprising a first terminal, a second terminal and a control terminal, wherein the first terminal is coupled to a power-supply device, and the second terminal is coupled to a load, and the control terminal is coupled to a second control unit;
    a current sensing device, comprising a first contact and a second contact, wherein the first contact is coupled to the second terminal of the switch and the load; and
    the regulating device of claim 1, wherein the input side of the common mode choke is coupled to the second contact of the current sensing device;
    wherein the second control unit controls the switch based on a current passing through the current sensing device; when the second control unit identifies that a current maximum target value is higher than the current by an amount that is outside a target range, the second control unit turns the switch on.

7. The battery automatic balancing system of claim 6, wherein when the second control unit identifies that the current is higher than a current minimum target value by an amount that is outside the target range, the second control unit turns the switch on.

8. The battery automatic balancing system of claim 7, wherein the second control unit is coupled to the current sensing device in each of the plurality of battery automatic regulation devices for computing the current maximum target value and the current minimum target value.

9. The battery automatic balancing system of claim 6, wherein the target range is 16 milliamperes (mA).

10. The battery automatic balancing system of claim 6, further comprising the second control unit.

* * * * *